United States Patent Office 2,816,072

Patented Dec. 10, 1957

2,816,072

METHOD OF REDUCING WATER LOSS OF LIME BASE DRILLING FLUIDS

Thomas E. Watkins, Arlington, Tex., assignor, by mesne assignments, to Socony Mobil Oil Company, Inc., a corporation of New York No Drawing. Application October 30, 1953, Serial No. 389,490

6 Claims. (Cl. 252—8.5)

This invention relates to drilling fluids and relates more particularly to the treatment of lime base drilling fluids to reduce water loss.

In the rotary drilling of oil and gas wells, a drilling fluid is employed for the purposes of lubricating the drill bit, carrying cuttings to the surface, and imposing a hydrostatic pressure to prevent flow of fluid from the drilled formations into the bore hole. Ordinary aqueous drilling fluids comprise essentially aqueous suspensions of a clay which imparts thixotropic properties to the suspensions, and lime base drilling fluids, used for particular purposes, comprise essentially aqueous suspensions of a clay which imparts thixotropic properties to the suspensions plus lime in excess of the stoichiometric amount required to react with the clay. With both of these types of drilling fluids, as the bore hole is drilled through porous formations, difficulty is encountered as a result of loss of water from the drilling fluid into the formations by filtration through the mud sheath formed from the drilling fluid on the wall of the bore hole. It is highly desirable to maintain this loss of water by filtration, or water loss as it is commonly termed, as low as possible in order not only to prevent changes in the viscosity and other properties of the drilling fluid but also to prevent clogging of the formation where the formation is productive of oil or gas. Various agents have been added to ordinary aqueous drilling fluids to reduce water loss but these agents have not been found to be uniformly effective in lime base drilling fluids.

It is the principal object of this invention to improve the water loss properties of lime base drilling fluids. Other objects of the invention will become apparent from the following description thereof.

In accordance with the invention, lime base drilling fluids are treated to reduce water loss by addition thereto of Irish moss.

It is realized that Irish moss has heretofore been employed in ordinary drilling fluids for reducing water loss. However, while Irish moss has been used in ordinary drilling fluids, in so far as I am aware Irish moss has not been used in lime base drilling fluids and the use in lime base drilling fluids is to be distinguished from the use in ordinary drilling fluids.

Ordinary drilling fluids, as mentioned previously, comprise water and a clay, such as bentonite, which imparts thixotropic properties to the suspension. Various additives may be mixed with the suspension. The clay particles, consisting of sodium or aluminum silicate, form a colloidal suspension having, in varying degrees, gel strength, viscosity, water loss, and wall building properties required in a drilling fluid. However, upon admixture of the drilling fluid with sodium chloride, calcium chloride, calcium sulfate, or other salts picked up during drilling, the clay particles flocculate with resultant loss of gel strength and wall building properties and undesired large increase in viscosity and water loss.

A lime base drilling fluid differs markedly from an ordinary aqueous drilling fluid. A lime base drilling fluid contains water, clay, lime, and sodium hydroxide. By "lime" is meant calcium hydroxide. The amount of lime is in excess of the stoichiometric amount capable of combining with the clay. However, since the lime is relatively insoluble in water, only a relatively small portion of the available calcium is in the form of ions and, therefore, by the law of mass action, only a portion of the clay is combined with calcium ions to form calcium clay. Upon admixture of the lime and the clay in the presence of water, the portion of the clay which combines with calcium ions to form calcium clay flocculates but, upon aging, the flocculated clay particles reform to a colloidal suspension having desired drilling fluid properties. Further, since, as compared to drilling fluids containing a water-soluble calcium salt in excess of the stoichiometric amount capable of combining with the clay, only a portion of the clay combines with calcium ions to form calcium clay, the drilling fluid retains gel strength and wall building properties and the water loss does not become excessive. Contamination of a lime base drilling fluid with sodium chloride and other salts picked up during drilling therefore does not greatly affect the desired properties since a portion of the clay has already been flocculated and has reformed and is thereby immune to the flocculating tendencies of the salts. These drilling fluids accordingly are employed for drilling through salt domes, through formations containing salt water or anhydrite, through cement, through heaving shale, or through bentonite.

Usually, lime base drilling fluids contain about 5 to 25 pounds per barrel of lime and have a high pH, for example, a pH of at least 12, not only because of the calcium hydroxide present but also because of the sodium hydroxide which is employed to assist in counteracting the effects of contaminating salts. The amount of the sodium hydroxide is usually one-quarter of the amount of lime, on a weight basis. Because of the differences in the chemical nature and the pH of the clay suspension, treatments for improving water loss properties applicable to ordinary drilling fluids are not always applicable to lime base drilling fluids.

In the practice of the invention, I prefer to employ Irish moss in the leaf form. Further, I prefer that the Irish moss be ground to pass through a Number 20 screen, U. S. Standard Series, i. e., the Irish moss should be sufficiently small to pass through an opening .047 inch square. The Irish moss conveniently is added to the drilling fluid by means of a hopper.

The amount of Irish moss to be added to the lime base drilling fluids to reduce water loss will depend upon the extent to which the water loss is to be reduced and upon the composition of the lime base drilling fluid. Generally, amounts of Irish moss, the Irish moss being taken on a dry basis since the water content will vary, between 0.1 pound per barrel and 3 pounds per barrel of drilling fluid will effectively reduce water loss. However, the proper amount to be added to any lime base drilling fluid to obtain a desired reduction in water loss may be determined by addition of varying amounts to samples of the drilling fluid and determining the water loss properties of the samples by conventional testing methods.

The following examples are illustrative of the results to be obtained by the invention.

EXAMPLE I

This example will illustrate the efficacy of Irish moss for reducing the water loss of a lime base drilling fluid. For purposes of comparison, there will be shown the effectiveness of Irish moss and sodium carboxymethylcellulose in reducing the water loss of an ordinary drilling fluid and the ineffectiveness of sodium carboxymethylcellulose in reducing the water loss of the lime base drilling fluid.

An ordinary drilling fluid was prepared consisting of water and the following components in the amounts indicated:

| | Pounds per barrel of drilling fluid |
|---|---|
| High grade sodium montmorillonite clay | 7 |
| High kaolinite content clay | 55 |
| Sodium chloride | 17 |

This drilling fluid was aged at 170° F. for 40 hours and the water loss was determined. To separate portions of the aged fluid were added Irish moss and sodium carboxymethylcellulose in the amount of 2 pounds per barrel. The portions were aged at 170° F. for 16 hours, and the water loss determined.

A lime base drilling fluid was prepared consisting of water and the following components in the amounts indicated:

| | Pounds per barrel of drilling fluid |
|---|---|
| High grade sodium montmorillonite clay | 44 |
| High calcium montmorillonite clay | 133 |
| Sodium chloride | 19 |
| Calcium hydroxide | 8 |
| Sodium hydroxide | 1 |
| Quebracho | 2 |

The water loss of this fluid was determined after aging at 170° F. for 40 hours. Thereafter, to separate portions of the fluid were added Irish moss and sodium carboxymethylcellulose in the amount of 2 pounds per barrel. The portions were aged at 170° F. for 16 hours and the water loss determined thereafter.

The table gives the results obtained.

*Table I*

| Type of drilling Fluid | Water Loss Reducing Agent | Water Loss (API 30 Minute Water Loss)—cc. |
|---|---|---|
| Ordinary | None | 88.7 |
| Do | Irish Moss | 11.8 |
| Do | Sodium Carboxymethylcellulose | 19.3 |
| Lime Base | None | 84.2 |
| Do | Irish Moss | 12.6 |
| Do | Sodium Carboxymethylcellulose | 77.5 |

It will be seen from the table that Irish moss effectively reduced the water loss of the lime base drilling fluid, i. e., reduced the water loss from 88.7 cc. to 12.6 cc. It will also be seen from the table that while Irish moss and sodium carboxymethylcellulose effectively reduced the water loss of the ordinary drilling fluid, sodium carboxymethylcellulose was ineffective to a large extent for reducing the water loss of the lime base drilling fluid.

EXAMPLE II

In this example, Irish moss was added to a weighted drilling fluid having a high water loss. The weighted drilling fluid was prepared with water and with the following components in the amounts indicated:

| | Pounds per barrel of drilling fluid |
|---|---|
| High grade sodium montmorillonite clay | 42 |
| High calcium montmorillonite clay | 123 |
| Sodium chloride | 21 |
| Calcium hydroxide | 4 |
| Sodium hydroxide | 1 |
| Quebracho | 2 |
| Barites | 75 |

The water loss of this fluid was measured after aging at 170° F. for 40 hours. One pound per barrel of Irish moss was added to the fluid and the water loss determined after aging at 170° F. for 16 hours. The water loss of the untreated fluid was 62.5 cc. whereas the water loss of the fluid after treatment with Irish moss was 14.7 cc.

EXAMPLE III

In this example, the effect of Irish moss in reducing the water loss of a lime base drilling fluid having a high water loss is illustrated. The drilling fluid was prepared with water and with the following components in the amounts indicated:

| | Pounds per barrel of drilling fluid |
|---|---|
| High grade sodium montmorillonite clay | 44 |
| High calcium montmorillonite clay | 132 |
| Sodium chloride | 19 |
| Calcium hydroxide | 4 |
| Sodium hydroxide | 1 |
| Quebracho | 2 |

The water loss was determined after aging at 170° F. for 40 hours. To separate portions of the aged drilling fluid were added varying amounts of Irish moss and the portions were aged at 170° F. for 16 hours, after which the water loss of each portion was determined. The table gives the results obtained.

*Table II*

| Amount of Irish Moss Added—Pounds per Barrel of Drilling Fluid | Water Loss—cc. |
|---|---|
| | 106.3 |
| 0.5 | 31.3 |
| 1.0 | 19.4 |
| 2.0 | 10.66 |
| 3.0 | 8.09 |

This is a continuation-in-part of my co-pending application Serial No. 181,911, filed August 28, 1950, now abandoned.

Having thus described my invention, it will be understood that such description has been given by way of illustration and example and not by way of limitation, reference for the latter purpose being had to the appended claims.

I claim:

1. A drilling fluid comprising in admixture water, clay, calcium hydroxide in an amount in excess of the stoichiometric amount capable of combining with the clay, sodium hydroxide in an amount such that the pH of the drilling fluid is at least 12, and, as a water loss reducing agent, Irish moss.

2. A drilling fluid comprising in admixture water, clay, calcium hydroxide in an amount in excess of the stoichiometric amount capable of combining with the clay, sodium hydroxide in an amount such that the pH of the drilling fluid is at least 12, and, as a water loss reducing agent, Irish moss in an amount between about 0.1 pound and 3 pounds per barrel of said drilling fluid.

3. A drilling fluid comprising in admixture water, clay, calcium hydroxide in an amount in excess of the stoichiometric amount capable of combining with the clay, sodium hydroxide in an amount such that the pH of the drilling fluid is at least 12, and, as a water loss reducing agent, Irish moss of particle size sufficiently small to pass through an opening .047 inch square in an amount between about 0.1 pound and 3 pounds per barrel of said drilling fluid.

4. In the drilling of a well wherein there is circulated in said well a drilling fluid comprising in admixture water, clay, calcium hydroxide in an amount in excess of the stoichiometric amount capable of combining with the clay, and sodium hydroxide in an amount such that the pH of the drilling fluid is at least 12, the method of reducing the loss of water from the drilling fluid into the earth formations through the drilling fluid sheath formed on the walls of said well comprising adding to said drilling fluid Irish moss and circulating said drilling fluid in said well.

5. In the drilling of a well wherein there is circulated in said well a drilling fluid comprising in admixture water, clay, calcium hydroxide in an amount in excess of the stoichiometric amount capable of combining with the clay, and sodium hydroxide in an amount such that the pH of the drilling fluid is at least 12, the method of reducing the loss of water from the drilling fluid into the earth formations through the drilling fluid sheath formed on the walls of said well comprising adding to said drilling fluid Irish moss in an amount between about 0.1 pound and 3 pounds per barrel of said drilling fluid and circulating said drilling fluid in said well.

6. In the drilling of a well wherein there is circulated in said well a drilling fluid comprising in admixture water, clay, calcium hydroxide in an amount in excess of the stoichiometric amount capable of combining with the clay and sodium hydroxide in an amount such that the pH of the drilling fluid is at least 12, the method of reducing the loss of water from the drilling fluid into the earth formations through the drilling fluid sheath formed on the walls of said well comprising adding to said drilling fluid Irish moss of particle size sufficiently small to pass through an opening .047 inch square in an amount between about 0.1 pound and 3 pounds per barrel of said drilling fluid and circulating said drilling fluid in said well.

References Cited in the file of this patent

UNITED STATES PATENTS

| | | |
|---|---|---|
| 2,336,171 | Freeland et al. | Dec. 7, 1943 |
| 2,551,768 | Sherborne | May 8, 1951 |

OTHER REFERENCES

Rogers: Composition and Properties of Oil Well Drilling Fluids, First Edition, pages 360, 361 and 364 (1948), pub. by Gulf Pub. Co., Houston, Texas.